Aug. 28, 1945. E. E. HILKER 2,383,549
VALVE OPERATING MECHANISM
Filed April 18, 1944 5 Sheets-Sheet 4

Inventor
E. E. HILKER
By Malcolm F. Gannon
Attorney

Aug. 28, 1945.  E. E. HILKER  2,383,549
VALVE OPERATING MECHANISM
Filed April 18, 1944   5 Sheets-Sheet 5
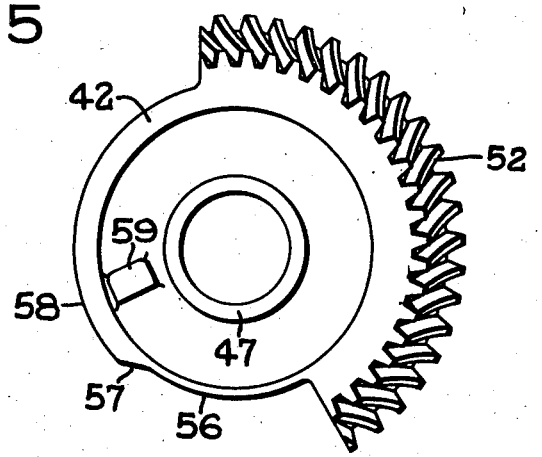
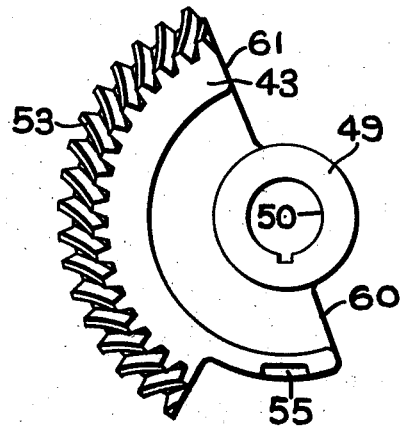
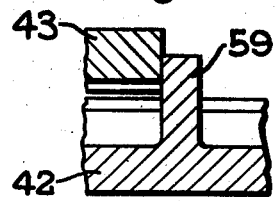
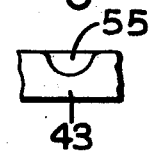
Inventor
E. E. HILKER
By Malcolm F. Gannett
Attorney Patented Aug. 28, 1945

2,383,549

UNITED STATES PATENT OFFICE 2,383,549

VALVE OPERATING MECHANISM

Earl E. Hilker, Spring Garden Township, York County, Pa., assignor to S. Morgan Smith Company, York, Pa., a corporation of Pennsylvania Application April 18, 1944, Serial No. 531,529

2 Claims. (Cl. 74—22)

This invention relates to valves, and more particularly to the mechanism for operating valves.

An object of the invention is to provide an improved valve operating mechanism in which a conical plug member is reciprocable between the wedged and unwedged position and is rotatable between open and closed position.

Another object of the invention is to provide an improved valve operating mechanism having rotatable means for actuating the means for reciprocating the plug between wedged and unwedged positions and for rotating the plug in its unwedged position.

Another object of the invention is to provide an improved valve operating mechanism which is characterized by its novelty, simplicity and efficiency under all conditions of service.

Another object of the invention is to provide an improved valve structure which includes a rotatable plug having a shaft with means operatively associated therewith and including a rotatable operating member for operating the mechanism in such a manner that the closed and seated valve plug is first moved axially to unwedge the same, and then rotated to its open position.

Another object of the invention is to provide an improved means for imparting rotary and axial movements to a member having a shaft formed with a threaded portion in which the operating means includes a pair of worm wheel sectors and a worm for operating the same, the hub of one of said worm wheel sectors being formed with an internally threaded portion mounted on the threaded portion of said shaft for moving the shaft axially when rotated, the second worm wheel sector having a sliding key connection with said shaft for rotating the shaft when the second worm wheel sector is operated, the center of radius of curvature of the throats of the teeth of both said worm wheel sectors being a single point coinciding with the center of said worm, the first worm wheel sector being continuously in mesh with the worm and the second worm wheel sector being intermittently in mesh with the worm.

With the foregoing and other objects and advantages in view, the invention consists in the preferred construction and arrangement of the several parts which will be hereinafter fully described and claimed.

In the accompanying drawings:

Fig. 5 is a plan view of the lifter gear sector;

Fig. 6 is a plan view of the rotator gear sector;

Fig. 7 is a detail section view taken on the line 7—7 of Fig. 3; and

Fig. 8 is a detail elevation of a portion of the periphery of the gear shown in Fig. 6.

Figure 1:
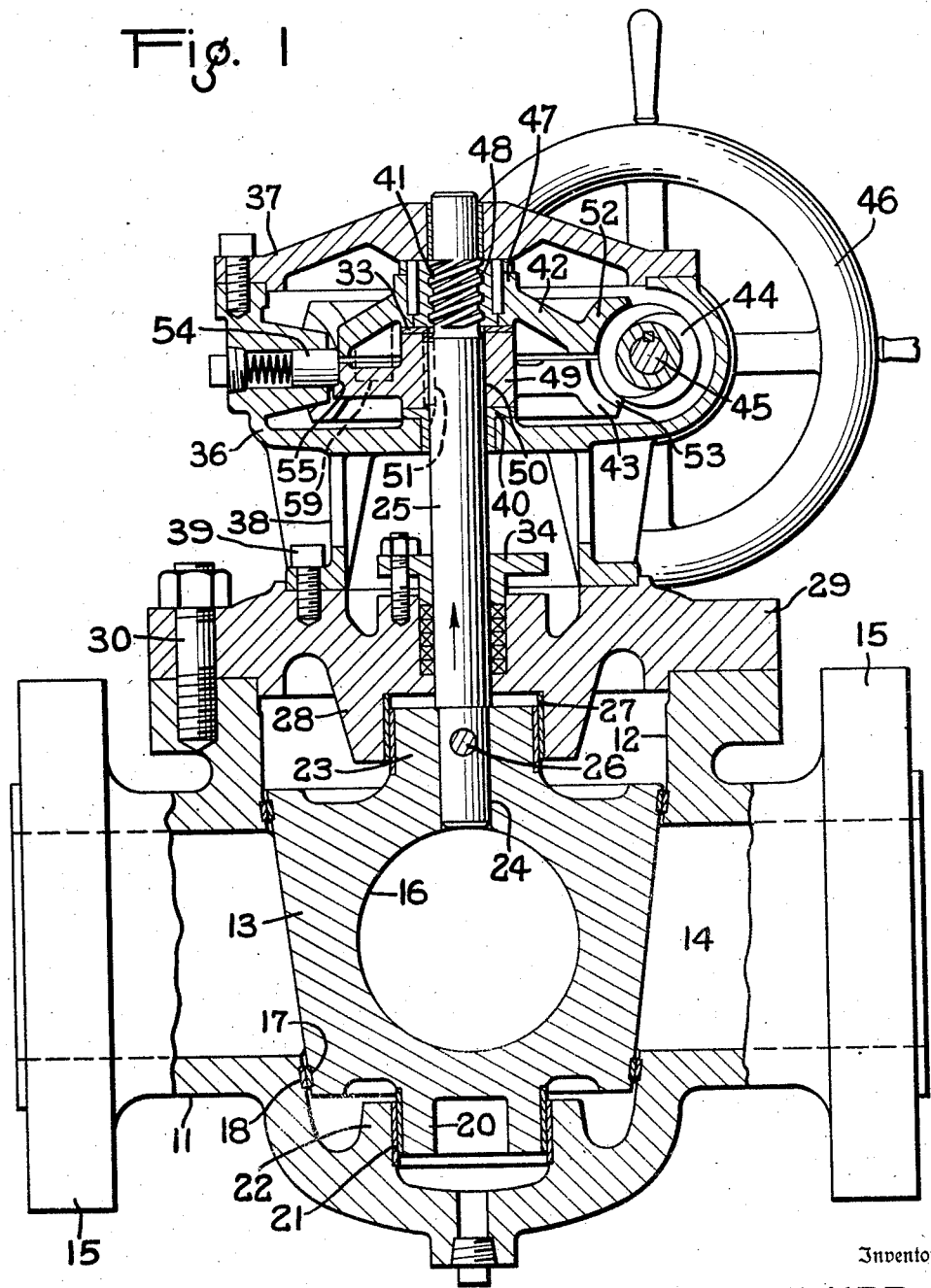
Fig. 1 is a vertical longitudinal section through a tapered plug valve embodying the present invention, the plug being shown in closed position.

Referring to the drawings, the improved valve comprises a main body or casing 11 having a cavity 12 formed therein for a tapered plug 13, the cavity being intersected by a longitudinal waterway or opening 14 which constitutes a passage through the valve. The portion of the casing 11 in which the waterway 14 is formed may terminate in flanges 15, by which the valve can be connected to the ends of pipes or conduits in well known manner.

Figure 4:
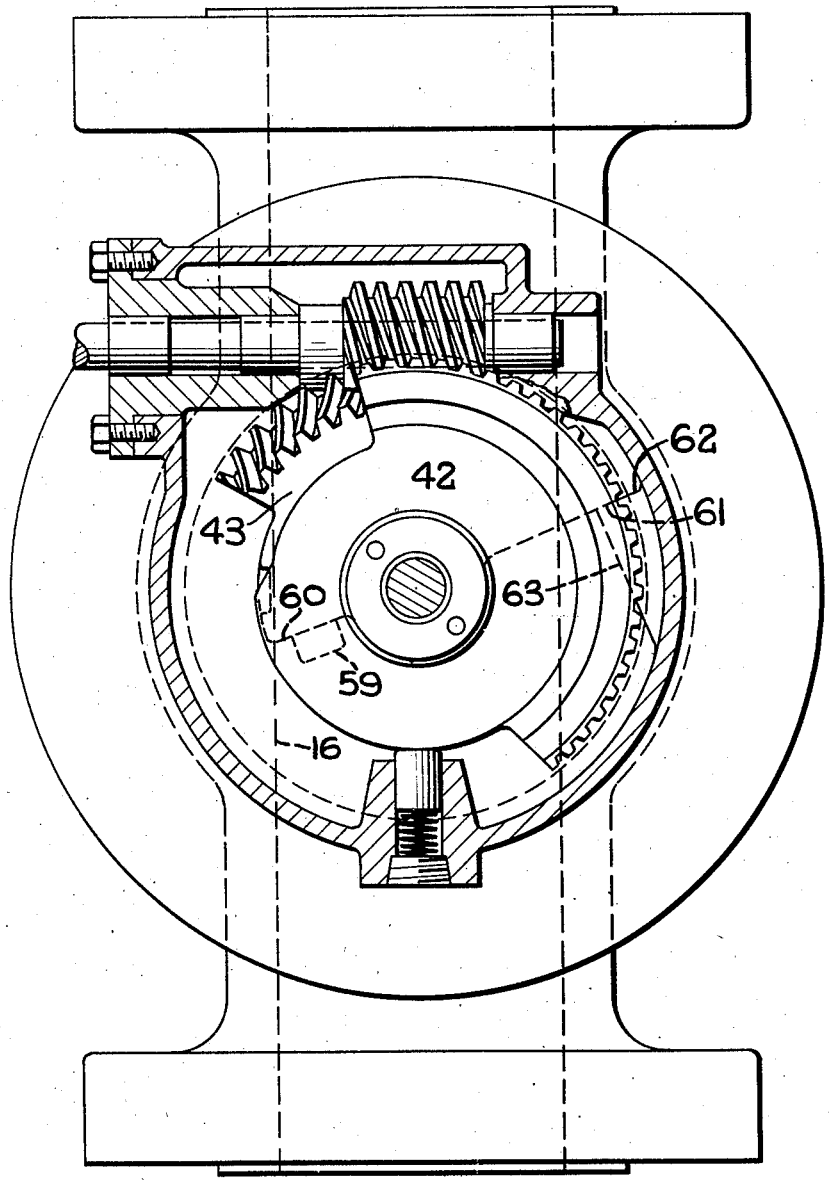
Fig. 4 is a view similar to Fig. 2 showing the parts in plug open position.

The plug 13 has a passage 16 formed therein, so that when the plug is in the open position shown in Fig. 4, a bore will extend through the valve from end to end.

The plug 13 may have seat rings 17 which are adapted to engage seat rings 18 mounted in the body 11 so as to provide a seal between the plug and the valve body when the plug is in seated position.

The plug 13 is supported for both axial and rotary movement in the valve body 11. At its inner or smaller end the plug 13 is formed with an extension in the nature of a trunnion 20 which is adapted to be disposed in a bore 21 formed in a tubular extension 22 projecting inwardly from the smaller end of the valve body.

At its outer or larger end, the plug 13 has an extension 23 formed with a bore 24 in which is mounted one end of a shaft 25 of the valve operating mechanism. The shaft 25 may be connected to the plug 13 by means of a pin 26.

The extension 23, which constitutes a trunnion, is mounted in an opening 27 in a boss 28 depending from the underside of a cover plate 29, which closes the larger end of the valve body.

The cover plate 29 is detachably secured to the valve body 11 by an annular series of bolts 30, as shown in Fig. 1.

Suitable bushings are mounted on the trunnions 20 and 23, and in the openings 21 and 27, respectively, to permit free movement of the plug 13 with respect to its casing.

The point between the valve shaft 25 and the cover plate 29 is sealed by means of a packing gland 34.

The valve shaft 25 extends beyond the cover plate 29 a suitable distance, and near its outer end is formed with screw threads 41 of suitable pitch.

The outer portion of the valve shaft 25 is enclosed by a suitable housing composed of a lower section 36 and an upper section or cover plate 37. The operating mechanism for the valve is mounted within this housing.

The lower section 36 is arranged in spaced relation to the main body of the valve, being supported in spaced relation to the cover plate 29 by a series of legs 38.

The legs 38 are detachably connected to the cover plate by means of bolts or cap-screws 39.

The walls of the housing sections 36 and 37 are formed with suitable bushed openings through which the valve shaft 25 extends, and in which said shaft is rotatably mounted.

The valve plug operating mechanism comprises a worm and worm wheel constructed and arranged in an improved and novel manner.

Associated with the valve shaft 25 are two members 42 and 43. Taken together these two members simulate a worm wheel, since they are both formed with worm teeth, constructed and arranged so as to have meshing relationship with the teeth of a worm 44.

Figure 2:
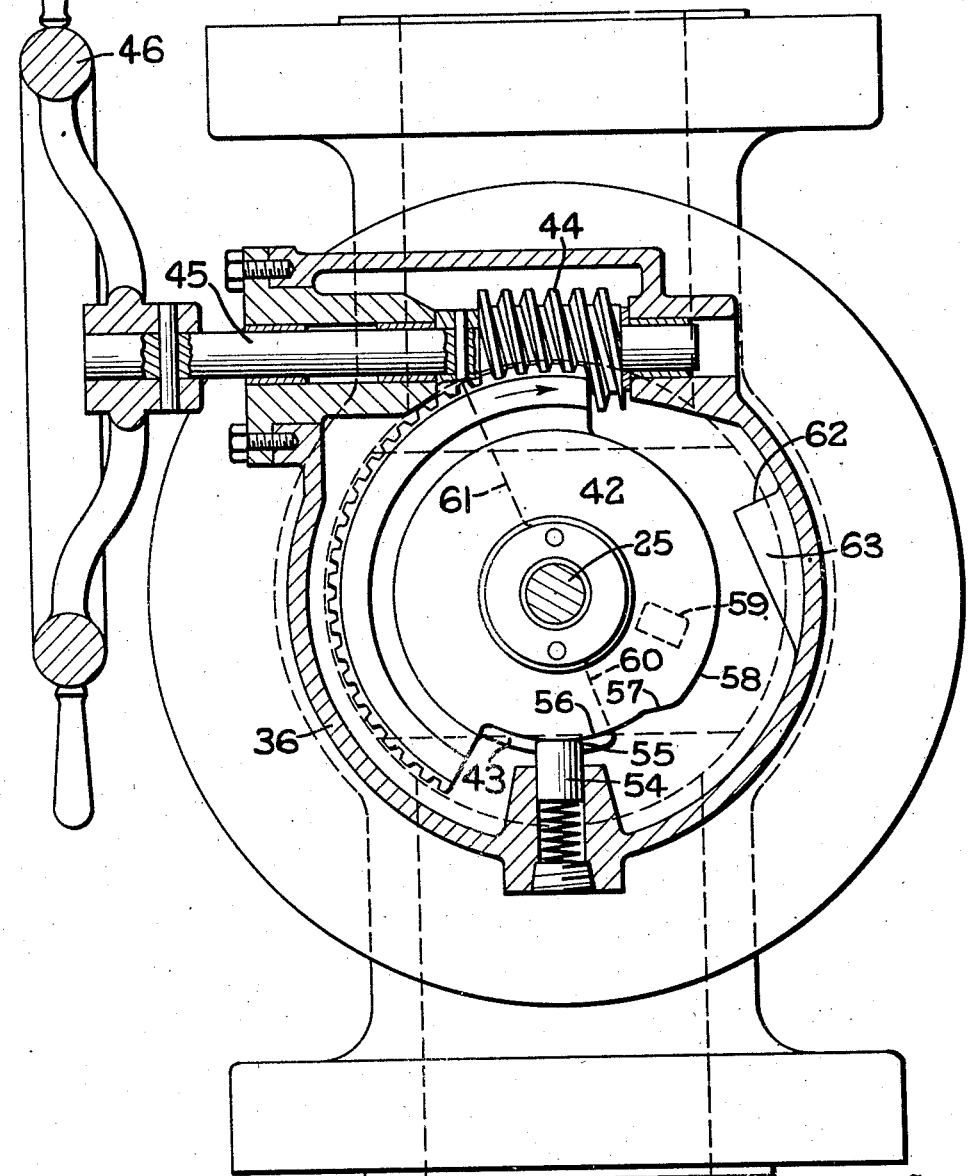
Fig. 2 is a horizontal section through the operating mechanism, the plug being shown in seated and closed position.

The worm 44 is of usual well known construction and is mounted on a shaft 45 journalled in the housing 36, in the manner shown best in Fig. 2.

The shaft 45 may be operated by any suitable means, such as a hand wheel 46. However, when so desired, it will be understood that shaft 45 can be operated by suitable power means, such as an electric motor, and the like.

The member 42 has a hub portion 47 which is formed at its center with an internally threaded element 48 adapted to engage the screw threaded portion 41 of the shaft 25.

The member 43 has a hub portion 49, the center of which is formed with a bore 50 through which the shaft 25 extends.

The member 42 is arranged to be rotated with respect to the shaft 25 during a portion of the operation of the device, and when so rotated said shaft and the plug 13 are moved axially due to the screw and nut connection afforded by the screw threads 41 engaging the threads of the element 48.

On the other hand, the member 43 is keyed to the shaft 25, as indicated at 51, so that when member 43 is rotated the shaft 25 and the plug 13 will be turned.

The members 42, 43 are retained within the housing 36 so as not to move axially of the shaft 25 by a portion of the cover 37 on one side which bears against the portion 48 of the member 42, and a bearing 40 on the other side, against which the hub 49 of the member 43 rests, as shown in Fig. 1. In other words, axial movement of the shaft 25 can be had without affecting the relative positions of the worm wheels 42, 43 within the housing 36, 37. A suitable bearing 33 is interposed between the hubs of the two worm wheels 42, 43 so as to permit free rotation of one worm wheel with respect to the other worm wheel during operation of the mechanism.

The periphery of the member 42 is formed with worm gear teeth 52. These teeth 52 may extend only partly around the periphery of the member 42, as shown best in Fig. 5.

Likewise, the periphery of the member 43 is formed with worm gear teeth 53, which may extend only partly around the periphery of the member 43, as shown best in Fig. 6.

As shown in Fig. 1, the toothed portions of the members 42, 43, are so formed that the radius of curvature of the throats of the teeth 52, 53 of both members is a single point, which point is the center of the worm 44 on shaft 45. Also, the teeth 52, 53, have the same pitch diameter, and the same face angle. Actually, the two sets of teeth 52, 53 are counterparts of a single worm wheel which has been divided or split in a plane at right angles or perpendicular to the axis of the worm wheel.

With the worm wheels 42, 43 constructed and arranged in the manner illustrated in the drawings, when the plug 13 is closed and seated (Fig. 1) only the teeth 52 are in meshing relationship with the teeth of the worm 44 (see Fig. 2). Consequently, when the shaft 45 is rotated, worm 44 imparts rotation only to worm wheel 42 with the result shaft 25 and plug 13 are moved axially in the direction of the arrow, Fig. 1.

In order to retain the worm wheel 43 from rotating during the initial rotation imparted to worm wheel 42, a spring pressed pawl 54 is provided.

A notch 55 is formed in the periphery of the worm wheel 43 in the manner shown in Figs. 1, 6 and 8.

When the parts are in the valve closed, plug seated position shown in Figs. 1 and 2 the tip of the pawl 54 will be disposed in the notch 55, to thereby prevent the worm wheel 43 from turning.

As shown in Fig. 1, the longitudinal axis of the spring pressed pawl 54 is arranged approximately along the line separating the two adjacent faces of the worm wheels 42, 43. Thus, the arrangement of the pawl 54 is such that a portion of its extremity or outer end is engageable with the periphery of the worm wheel 43, and another portion of its extremity or outer end is engageable with the periphery of the worm wheel 42.

The periphery of the worm wheel 42 is formed with a cam surface composed of three parts, indicated at 56, 57 and 58 (see Figs. 2 and 5). The cam surfaces 56 and 58 are concentric with teeth 52 of the worm wheel, cam surface 56 having a smaller radius than cam surface 58. Cam surface 57 is disposed at an angle to cam surfaces 56 and 58, and connects an end of cam surface 56 with the adjacent end of cam surface 58.

When the spring pressed pawl 54 is disposed within the notch 55, as shown in Figs. 1 and 2, a portion of the nose or extremity of the pawl is positioned adjacent to the cam surface 56. However, due to the fact that the pawl 54 is seated in the notch 55 there will not be any engagement of the pawl with the cam surface 56. In other words, during initial rotation of the worm wheel 42 from the position shown in Fig. 3 there should not be any frictional contact between the pawl and the cam surface 56.

A lug 59 is formed on the face of the worm wheel 42 that faces the inner face of the worm wheel 43 (see Figs. 1 and 5).

The worm wheel 43 is formed with a shoulder 60.

Figure 3:
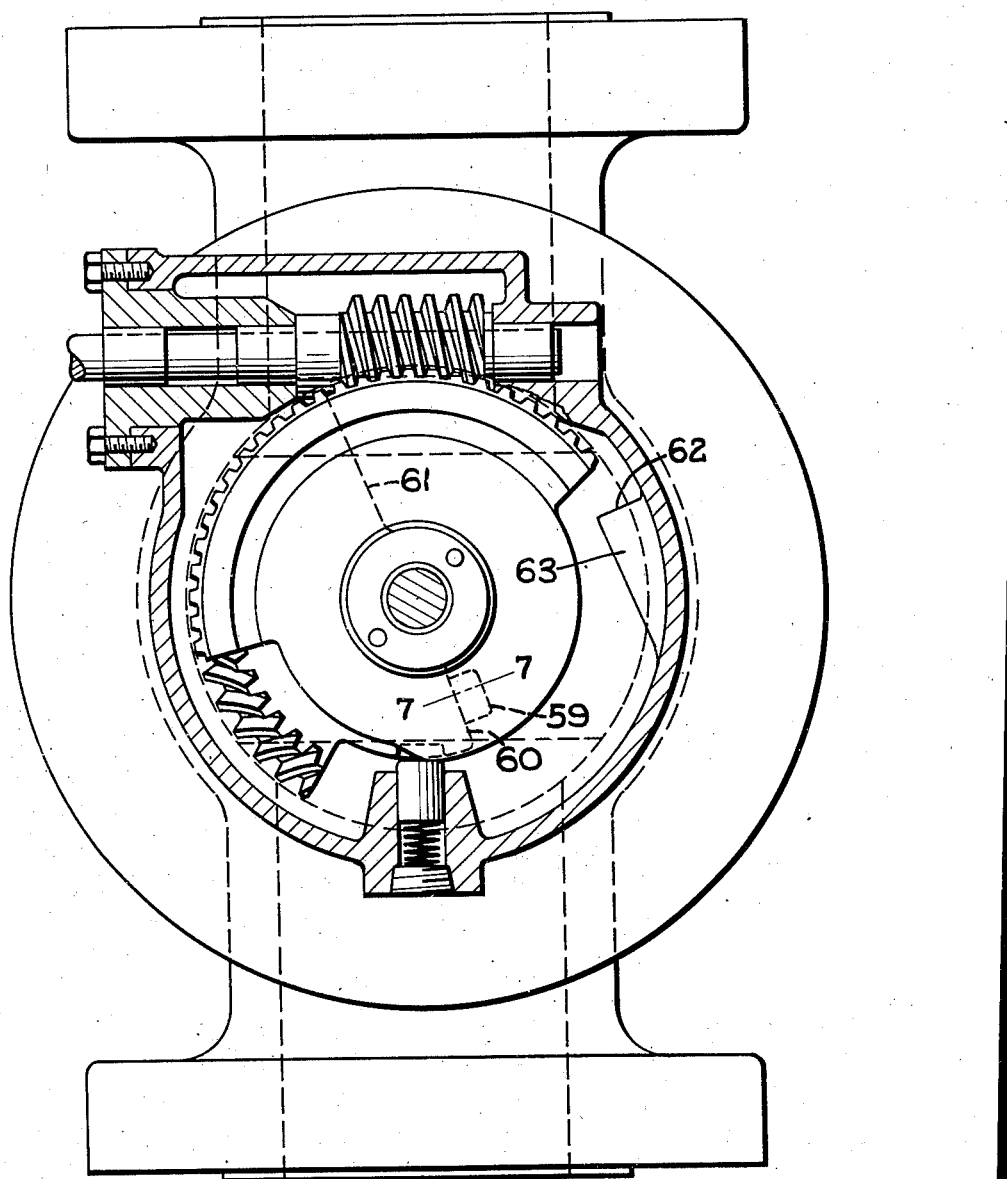
Fig. 3 is a view similar to Fig. 2, the parts being shown when the plug is in unseated and closed position.

The cam surface 57, lug 59 and shoulder 60 are so constructed and arranged that, when the worm wheel 42 has been rotated from the position shown in Fig. 2 towards the position shown in Fig. 3, in the direction of the arrow (Fig. 2), a predetermined amount, the extremity of the pawl 54 will engage cam surface 57 and be thereby moved out of the notch 55, and the lug 59 will then engage the shoulder 60. When the lug 59 engages shoulder 60, the pawl 54 will be in engagement with the cam surface 58 so that said pawl is out of contact with the periphery of the worm wheel 43.

Further rotation of shaft 45 now effects the joint rotation of both worm wheels 42, 43, whereby the shaft 25 and the plug 13 will be rotated. Due to the fact that both worm wheels 42, 43 are now rotated in unison, and shaft 25 is turned simultaneously with the worm wheel 42, there will not be any axial movement imparted to shaft 25 during the period of operation in which said shaft is rotated by the worm wheel 43.

The rotation of shaft 25 and the plug 13 will be arrested when shoulder 61 formed on the worm wheel 43 at a point substantially diametric to the location of shoulder 60, engages a stop 62 provided by a lug 63 formed on the casing 36.

Thus, it will be noted that during the operation of the mechanism to turn the plug 13 from closed to open position, during the first portion of the operation of the mechanism, the worm 44 rotates the worm wheel 42 which results in the nut provided by the threaded portion 48 moving the shaft 25 and the plug 13 axially in a direction to unwedge the plug. The two worm wheels 42, 43 are then interlocked so that the plug is turned through the desired angle (90 degrees) towards open position, and at the same time a follow up movement is imparted by the threaded portion 48 of worm wheel 42 to the screw threaded portion of the shaft 25 so that the plug 13 is held unseated while said plug is being rotated.

The reverse of all this action takes place with the rotation of the hand wheel 46 in the direction to close the valve.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described my invention, what I claim is:

1. In means for imparting retilinear and rotary movements to a member having a shaft provided with a threaded portion, a worm wheel sector having a hub formed with an internal threaded portion mounted on the threaded portion of said shaft for moving said shaft and said member rectilinearly when said worm wheel sector is rotated, a second worm wheel sector fixed to said shaft for rotating said shaft and said member when said second worm wheel sector is rotated, an operating shaft having a worm thereon, the longitudinal center line of said worm being arranged at right angles to the longitudinal center line of the first shaft, worm gear teeth formed partly around the periphery of each said worm wheel sectors for meshing engagement with the teeth of said worm, the center of the radius of curvature of the throats of said teeth of both said worm wheels being a single point coinciding with the center of said worm, whereby the teeth of both said worm wheels have the same pitch diameter and are counterparts of a single worm wheel which has been divided or split in a plane at right angles or perpendicularly to the axis of the worm wheel, the arrangement of the teeth of said first worm wheel sector with respect to the arrangement of the teeth of said second worm wheel sector being such that when the member and its shaft are in one position the teeth of said first worm wheel will be in meshing relationship with the teeth of the worm and the teeth of said second worm wheel will be out of meshing relationship with the teeth of the worm whereby at the initiation of rotation of said worm said first worm wheel will be operated to effect a rectilinear movement to said shaft and said member without imparting a rotary movement thereto, means frictionally engaging said second worm wheel sector for holding said second worm wheel sector stationary during the initial operation of said first worm wheel sector, means carried by said first worm wheel sector and engageable with said second worm wheel sector when said first worm wheel sector has been turned through a predetermined arc for moving said second worm wheel sector into position whereby the teeth of said second worm wheel sector are brought into meshing relationship with the worm teeth whereby said second worm wheel sector is turned by said worm to thereby impart a rotary movement to said shaft and said member, said first worm wheel sector continuing in mesh with said worm during rotation of said second worm wheel sector, and means for limiting the amount of rotation imparted said shaft and said member by said second worm wheel sector.

2. In means for imparting rectilinear and rotary movements to a member having a shaft provided with a threaded portion, a worm wheel sector having a hub formed with an internal threaded portion mounted on the threaded portion of said shaft for moving said shaft and said member rectilinearly when said worm wheel sector is rotated, a second worm wheel sector fixed to said shaft for rotating said shaft and said member when said second worm wheel sector is rotated, an operating shaft having a worm thereon, the longitudinal center line of said worm being arranged at right angles to the longitudinal center line of the first shaft, worm gear teeth formed partly around the periphery of each said worm wheel sectors for meshing engagement with the teeth of said worm, the center of the radius of curvature of the throats of said teeth of both said worm wheels being a single point coinciding with the center of said worm, whereby the teeth of both said worm wheels have the same pitch diameter and are counterparts of a single worm wheel which has been divided or split in a plane at right angles or perpendicularly to the axis of the worm wheel, the arrangement of the teeth of said first worm wheel sector with respect to the arrangement of the teeth of said second worm wheel sector being such that when the member and its shaft are in one position the teeth of said first worm wheel will be in meshing relationship with the teeth of the worm and the teeth of said second worm wheel will be out of meshing relationship with the teeth of the worm whereby at the initiation of rotation of said worm said first worm wheel will be operated to effect a rectilinear movement to said shaft and said member without imparting rotary movement thereto, means frictionally engaging said second worm wheel sector for holding said second worm wheel sector stationary during the initial operation of said first worm wheel sector, means for releasing said holding means when said first worm wheel sector has been turned through a predetermined arc, means carried by said first worm wheel sector and engageable with said second worm wheel sector when said holding means has been released for moving said second worm wheel sector into mesh with said worm whereby said second worm wheel sector is operated by said worm to thereby rotate said shaft and said member, said first worm wheel sector continuing in mesh with said worm during rotation of said second worm wheel sector, and means for limiting the amount of rotation imparted by said second worm wheel sector to said shaft and said member.

EARL E. HILKER.